(12) United States Patent
Joo et al.

(10) Patent No.: US 9,243,347 B2
(45) Date of Patent: Jan. 26, 2016

(54) PROCESS OF MAKING NANOFIBERS

(75) Inventors: Yong L. Joo, Ithaca, NY (US);
Daehwan Cho, Ithaca, NY (US);
Eduard Zhmayev, Ithaca, NY (US)

(73) Assignee: Cornell University, Ithaca, NY (US)

( * ) Notice: Subject to any disclaimer, the term of this patent is extended or adjusted under 35 U.S.C. 154(b) by 496 days.

(21) Appl. No.: 13/579,079

(22) PCT Filed: Feb. 15, 2011

(86) PCT No.: PCT/US2011/024894
§ 371 (c)(1),
(2), (4) Date: Oct. 25, 2012

(87) PCT Pub. No.: WO2011/100743
PCT Pub. Date: Aug. 18, 2011

(65) Prior Publication Data
US 2013/0040140 A1    Feb. 14, 2013

Related U.S. Application Data

(60) Provisional application No. 61/304,666, filed on Feb. 15, 2010, provisional application No. 61/305,730, filed on Feb. 18, 2010.

(51) Int. Cl.
*D01D 5/08* (2006.01)
*D01D 5/00* (2006.01)
*D01D 5/24* (2006.01)
*D01D 5/14* (2006.01)
*D01D 5/098* (2006.01)

(52) U.S. Cl.
CPC ............ *D01D 5/0069* (2013.01); *D01D 5/0092* (2013.01); *D01D 5/0985* (2013.01); *D01D 5/14* (2013.01); *D01D 5/24* (2013.01); *D01D 5/0023* (2013.01); *D01D 5/0038* (2013.01); *Y10T 428/298* (2015.01)

(58) Field of Classification Search
CPC . D01D 5/0007; D01D 5/0015; D01D 5/0023; D01D 5/003; D01D 5/0038; D01D 5/0046; D01D 5/0053; D01D 5/0092; D01D 7/00
USPC ............... 264/10, 211.12, 464, 465, 466, 484
See application file for complete search history.

(56) References Cited

U.S. PATENT DOCUMENTS

| 2,810,426 | A | 10/1957 | Till et al. |
| 6,382,526 | B1 * | 5/2002 | Reneker et al. ............... 239/294 |
| 7,575,707 | B2 | 8/2009 | Xia et al. |

(Continued)

FOREIGN PATENT DOCUMENTS

| CN | 101126179 A | 2/2008 |
| JP | 2005520068 A | 7/2005 |
| JP | 2009275339 A | 11/2009 |

OTHER PUBLICATIONS

The International Bureau of WIPO, International Preliminary Report on Patentability for corresponding International Application No. PCT/US2011/024894 dated Aug. 21, 2012 (9 pgs).
European Patent Office, Supplementary Partial European Search Report for Corresponding EP Application No. EP 11743004 dated Nov. 11, 2013 (9 pgs).

(Continued)

*Primary Examiner* — Leo B Tentoni
(74) *Attorney, Agent, or Firm* — Harris Beach PLLC

(57) ABSTRACT

Provided herein are gas and/or temperature assisted electrospinning apparatus, processes, components and polymer nanofibers.

10 Claims, 6 Drawing Sheets

(56) References Cited

U.S. PATENT DOCUMENTS

| | | |
|---|---|---|
| 2005/0067732 A1 | 3/2005 | Kim et al. |
| 2006/0013869 A1 | 1/2006 | Ignatious et al. |
| 2006/0049542 A1 | 3/2006 | Chu et al. |
| 2007/0018361 A1 | 1/2007 | Xu |
| 2008/0233284 A1 | 9/2008 | Kim et al. |
| 2008/0261043 A1 | 10/2008 | Greiner et al. |
| 2009/0093585 A1 | 4/2009 | Smith et al. |
| 2010/0041296 A1* | 2/2010 | Lopez et al. ............ 264/465 X |

OTHER PUBLICATIONS

Kong, et al., Nanofiber deposition by electroblowing of PVA (polyvinyl alcohol), Journal of Materials Science, vol. 44, Jan. 13, 2009 (pp. 1107-1112).

Japanese Patent Office—English Translation of Office Action for Japanese Patent Application No. 2012-553095 mailed Dec. 24, 2014 (3 pages).

* cited by examiner

PROCESS OF MAKING NANOFIBERS

CROSS REFERENCE TO RELATED APPLICATION

This application is filed pursuant to 35 U.S.C. 371 as a United States National Phase Application of International Application Ser. No. PCT/US2011/024894, which claims the benefit of U.S. Provisional Application No. 61/305,730, filed Feb. 18, 2010, and of U.S. Provisional Application No. 61/304,666, filed Feb. 15, 2010, all of which applications are incorporated herein by reference.

STATEMENT OF GOVERNMENT INTEREST

This invention was made with government support under CAREER Award CTS-0448270 awarded by the National Science Foundation. The government has certain rights in the invention.

FIELD OF THE INVENTION

The present invention is directed toward a process and apparatus for the production of nanofibers. Specifically, the nanofibers are produced by a process utilizing a gas, and the apparatus is specifically adapted to deliver fiber-forming material to a gas stream and thereby initiate the formation of nanofibers.

BACKGROUND OF THE INVENTION

Electrospinning is a process for forming fibers, including nanofibers, through the action of electrostatic forces. When the electrical force at the interface of polymer overcomes surface tension, a charged jet is ejected. The jet initially extends in a straight line, then undergoes various whipping motions during the flight from nozzle to collector. The polymer is usually collected onto a grounded mesh or plate in the form of a nonwoven mat of high surface area. The resultant fibers have a fine thickness, ranging from micron-scale diameter to nano-scale. Polymer nanofibers, possessing high surface area to mass ratios, have great potential for applications in a wide variety of fields, including high performance filtration, chemical sensing, and biomedical engineering.

SUMMARY OF THE INVENTION

Provided herein is an electrospinning apparatus for forming nanofibers, comprising a first conduit suitable for providing a liquid polymer and a second conduit suitable for providing a gas stream. In some embodiments, the first and second conduits are tubes. In certain embodiments, the first conduit surrounds the second conduit. In another embodiment, the second conduit surrounds the first conduit. In some embodiments, the gas stream is a high velocity gas stream. In certain embodiments, the gas stream is heated. In some embodiments, the heated gas stream maintains a high temperature at the end of the first conduit providing a liquid polymer jet. In certain embodiments, the liquid polymer is a neat polymer melt. In other embodiments, the liquid polymer comprises a solvent (e.g., a polymer solution). In some embodiments, the solvent has low volatility. In certain embodiments, the heated gas stream enhances solvent evaporation. In other embodiments, the gas stream is cooled. In certain embodiments, the solvent has high volatility. In some embodiments, the cooled gas stream suppresses solvent evaporation and/or premature solidification.

Provided herein is an electrospinning apparatus for forming nanofibers, comprising a center tube having a first supply end and an opposing first nozzle end, the center tube defining an center chamber along a longitudinal axis, the center chamber adapted to provide a liquid polymer; a gas supply tube disposed in surrounding relation to the center tube, the gas supply tube having a second supply end and an opposing second nozzle end, the gas supply tube defining an outer chamber along the longitudinal axis, the outer chamber adapted to provide a high velocity gas stream; a voltage supply proximate to the center tube, the voltage supply adapted to impart an electrical charge to the liquid polymer so as to form a charged liquid polymer jet; and a collector positioned to capture hardened nanofibers formed from the charged liquid jet.

In some embodiments, the electrospinning apparatus further comprises a guide tube in the spinning zone coupled to the gas supply tube, the guide tube configured to provide a mixing region for the high velocity gas stream and the liquid polymer. In certain embodiments, the electrospinning apparatus further comprises heater for heating the high velocity gas stream. In some embodiments, the electrospinning apparatus further comprises a heater for heating the liquid polymer. In other embodiments, the electrospinning apparatus comprises cooler for cooling the high velocity gas stream.

In certain embodiments, the first nozzle end and the second nozzle end are in the same axial position along the longitudinal axis. In some embodiments, the gas supply tube comprises a plurality of chambers to provide multiple high velocity gas streams. In certain embodiments, the center tube comprises a plurality of chambers to provide multiple liquid polymer jets.

In some embodiments, the liquid polymer comprises a volatile solvent. In certain embodiments, the high velocity gas stream comprises a vapor of a solvent. In some embodiments, the hardened nanofibers have a diameter in the range of 50 nm to 10 µm. In certain embodiments, the gas stream velocity is in the range of 1 m/s to 300 m/s. In some embodiments, the gas stream temperature is in the range of 313K to 523K.

Also provided herein is an electrospinning apparatus for forming nanofibers, comprising a center tube having a first supply end and an opposing first nozzle end, the center tube defining an center chamber along a longitudinal axis, the center chamber adapted to provide a high velocity gas stream; a polymer-feeding tube disposed in surrounding relation to the center tube, the polymer-feeding tube having a second supply end and an opposing second nozzle end, the polymer-feeding tube defining an outer chamber along the longitudinal axis, the outer chamber adapted to provide a polymer liquid; a voltage supply proximate to the polymer-feeding tube, the voltage supply adapted to impart an electrical charge to the liquid polymer so as to form a charged liquid polymer jet; and a collector positioned to capture hardened nanofibers formed from the charged liquid jet.

In some embodiments, the electrospinning apparatus further comprises a heater for heating the high velocity gas stream. In certain embodiments, the electrospinning apparatus further comprises a heater for heating the liquid polymer. In other embodiments, the electrospinning apparatus further comprises a cooler for cooling the high velocity gas stream.

In some embodiments, the first nozzle end and the second nozzle end are in the same axial position along the longitudinal axis. In certain embodiments, the gas supply tube comprises a plurality of chambers to provide multiple high velocity gas streams. In some embodiments, the center tube comprises a plurality of chambers to provide multiple liquid polymer jets.

In certain embodiments, the liquid polymer comprises a volatile solvent. In some embodiments, the high velocity gas stream comprises a vapor of a solvent. In certain embodiments, the hardened nanofibers comprise hollow portions along the nanofiber axis, wherein the hardened nanofibers have a diameter in the range of 500 nm to 10 μm. In some embodiments, the gas stream velocity is greater than about 1 m/s, greater than about 10 m/s, or in the range of 1 m/s to 300 m/s. In certain embodiments, the gas stream temperature is greater than 313K, or in the range of 313-523 K.

Further provided herein is an electrospinning apparatus for forming nanofibers, the apparatus comprising a first conduit having a first supply end and a first nozzle end, the first conduit being suitable to express a liquid polymer; at least one gas supply conduit disposed in proximity to the first conduit, the gas supply conduit having a second supply end and a second nozzle end; and a high pressure gas system suitable for expelling high velocity gas from the second nozzle end. In some embodiments, the high pressure gas system comprises a pump, a high pressure gas canister, and/or a tapered gas supply conduit such that the second nozzle end is narrower than the second supply end. In certain embodiments, the gas supply conduit comprises a plurality of second nozzle ends.

Also provided herein is a process for preparing a nanofiber, the process comprising electrospinning a liquid polymer with a high velocity gas. In some embodiments, the liquid polymer surrounds the high velocity gas. In other embodiments, the high velocity gas surrounds the liquid polymer. In some embodiments, the high velocity gas is heated. In certain embodiments, the liquid polymer is a neat polymer melt or a polymer solution. In some embodiments, the high velocity gas comprises a vapor of a solvent or reagent.

Further provided herein is a process for preparing a nanofiber, the process comprising injecting a charged liquid polymer into a high velocity gas stream. In some embodiments, the liquid polymer is a neat polymer melt or a polymer solution. In certain embodiments, the high velocity gas stream surrounds a jet of the liquid polymer. In some embodiments, the high velocity gas stream is heated. In certain embodiments, the high velocity gas comprises a vapor of a solvent or reagent. In certain embodiments, the high velocity gas stream is confined within a guide channel.

Also provided herein is an electrospinning process, the process comprising generating a liquid polymer jet, wherein the liquid polymer jet continuously attenuates.

Further provided herein are fibers prepared according to any process or using any electrospinning apparatus described herein.

Provided herein is a hollow nanofiber comprising a polymer, wherein at least 10% of the fiber is hollow. In some embodiments, the nanofiber has a diameter of less than 1 μm. In certain embodiments, the polymer comprises a thermoplastic polymer. In some embodiments, the polymer comprises a water-soluble polymer. In certain embodiments, the polymer comprises a denatured protein based component.

Also provided herein is a solvent free fiber, wherein the fiber has a diameter of less than 1 μm. In some embodiments, the solvent free fiber comprises a water soluble polymer. In certain embodiments, the water soluble polymer is a protein or denatured protein, such as a soy protein. In some embodiments, the water soluble polymer is not soluble in and/or degrades in organic solvent. In certain embodiments, in a fiber mat comprising a plurality of solvent free fibers described herein, the plurality of solvent free fibers are not agglomerated.

Further provided herein is a melt electrospun fiber, wherein the melt electrospun fiber has a diameter of less than 1 μm.

Also provided herein is a fiber electrospun from an aqueous solution, wherein the fiber has a low water content. In some embodiments, in a fiber mat comprising a plurality of fibers electrospun from an aqueous solution described herein, the fibers are not agglomerated.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
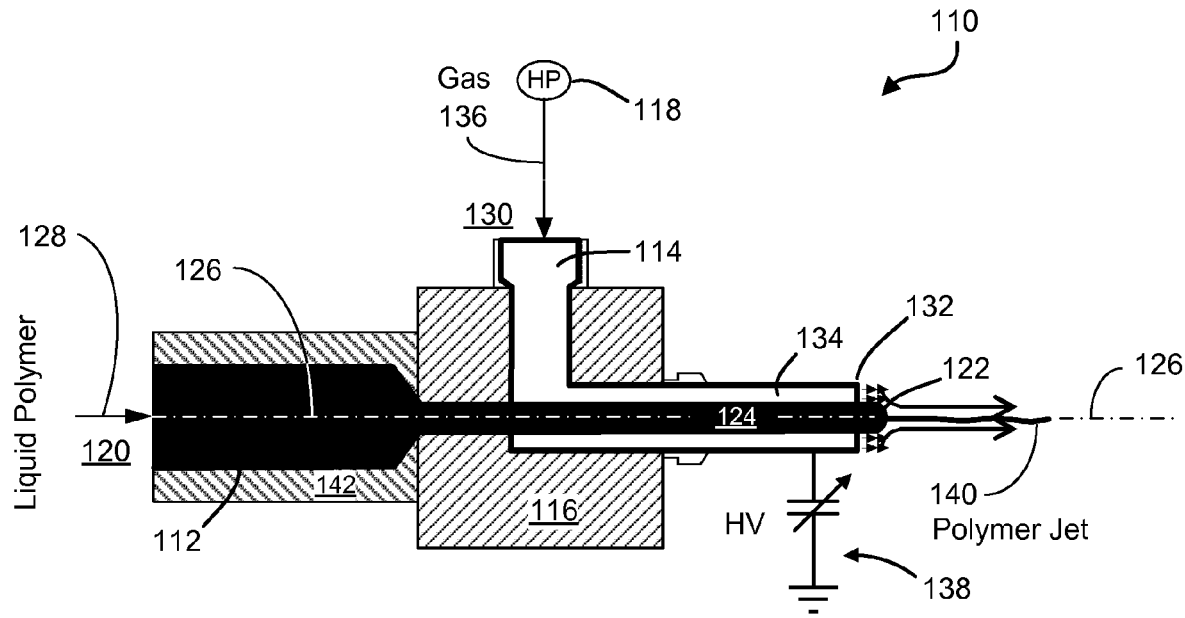
FIG. 1 shows a schematic of a spinneret for use in the gas-assisted melt electrospinning (GAME) process with an outer channel for heated gas supply.

Provided in various embodiments herein are electrospinning processes and apparatus, as well as electrospun fibers. In certain embodiments, provided herein is an apparatus for forming nanofibers, comprising a first conduit suitable for providing a liquid polymer and a second conduit suitable for providing a gas stream, and/or a process of using the same. Such electrospinning processes and apparatus may be used with any suitable liquid polymer including, e.g., polymer melts (such as neat polymer melts or polymer melts comprising additional materials, such as solvents or reagents) or polymer solutions.

In some instances, electrospinning directly from polymer melts offers several advantages. First, dissolution of polymers in organic solvents and their removal/recycling are no longer required. Second, a higher throughput can be achieved because no mass is lost through solvent evaporation. Third, submicron-scale fibers of polymers that do not have appropriate solvents at room temperature, such as polyethylene and polypropylene, can be obtained.

In certain instances, electrospinning (e.g., from polymer melts) can be improved, such as through simplifying complicated setups, preventing or inhibiting solidification or precipitation of polymer in the nozzle of an electrospinning apparatus, reducing viscosity of polymer (and/or polymer diameter), and improving liquid polymer conductivity. In one aspect, provided herein is an apparatus or process wherein a high temperature nozzle is utilized to keep the polymer molten, and additional deformation is utilized to keep providing jet thinning during electrospinning (e.g., melt electrospinning).

Further provided herein are apparatus and processes wherein gas assisted melt electrospinning is utilized. Such techniques may include a heated gas stream (e.g., high velocity heated gas stream) being applied to one of two or multiple axial jets (e.g., at least one gas jet and at least one melt jet). The heated gas jet can secure the nozzle heating for inner melt jet(s) and thus delay solidification. In some instances, as the heated gas passes through the outer channel of a spinneret, the temperature of a molten polymer in the inner channel of the spinneret is kept high, and furthermore, the ejected heated gas jet offers additional thinning of the melt jet due to huge tangential drag force. A high flow rate of heated gas can keep providing additional drag force to the jet surface, leading to thinner fibers with a higher production rate. In some instances, control of the temperature, quantity, and velocity of the gas stream in gas assisted melt electrospinning (GAME) processes, allows for the production of thinner fibers with higher production rate. In some instances, due to additional deformation caused by the heated gas stream, submicron scale fibers are obtained from melt electrospinning even without inducing the whipping motion. Without the whipping motion of the polymer jet, a guide channel for the melt jet surrounded by a heated gas stream can optionally be installed to control the orientation and layout of product fibers.

In a reverse configuration where the inner channel is used for a gas stream, the resulting fibers can possess a hollow structure along the fiber axis. The controlled gas runs through the inner channel of a spinneret, while a molten polymer passes through the outer channel. In some instances, the inner gas stream prevents the outer melt jet from collapsing, resulting in fibers that possess a hollow structure along the fiber axis.

Furthermore, the gas-assisted electrospinning process is also applied to solution electrospinning, especially to a system that uses solvents with low volatility. For instance, water is very difficult to evaporate. In certain instances, air convection induced by the stream of gas increases solvent evaporation, while additional thinning of the jet due to the drag force on the jet surface still takes place. For solution electrospinning applications using solvents with high volatility, a cold gas stream produces thinner fibers by suppressing solvent evaporation and premature solidification.

GAME—Outside Gas Stream

In one aspect, provided herein is a gas assisted electrospinning apparatus comprises an outer channel configured to pass a high velocity gas stream and an inner channel to pass a liquid polymer. In certain embodiments, the liquid polymer is a molten liquid polymer. In some embodiments, the molten liquid polymer further comprises a solvent.

Provided herein is an electrospinning apparatus 110 for forming nanofibers according to FIG. 1. In some instances, an electrospinning apparatus described herein comprises a first (e.g., liquid polymer or melt) tube 112, and a gas supply tube 114 in proximity to the center tube. In some embodiments, the apparatus further comprises a heating system 116 (e.g., a heater). In certain embodiments, the apparatus further comprises a high pressure gas system 118 (i.e., a system suitable for providing a high velocity gas at the nozzle end of the gas supply tube). In some embodiments, the first tube 112 (e.g., center tube) has a first supply end 120 and a first nozzle end 122 (e.g., at an opposing end). In specific embodiments, the first (e.g., center) tube 112 defines a chamber 124 along a longitudinal axis 126, the chamber suitable, configured, and/or adapted to provide a liquid polymer 128. In certain embodiments, the gas supply tube 114 is disposed in surrounding relation to the center tube 112, the gas supply tube having a second supply end 130 and a second nozzle end 132 (e.g., at an opposing end). In some embodiments, the gas supply tube 114 defines an outer chamber 134 (e.g., along the longitudinal axis), the outer chamber being suitable, configured, and/or adapted to provide a high velocity gas stream 136. In some embodiments, the electrospinning apparatus 110 further comprises a voltage supply 138 proximate to the first tube. In specific embodiments, the voltage supply 138 is suitable, configured, and/or adapted to impart an electrical charge to the liquid polymer so as to form a charged liquid polymer jet 140. In some embodiments, the electrospinning apparatus 110 further comprises a collector (see, e.g., FIG. 3) positioned to capture hardened nanofibers formed from the charged liquid polymer jet 140. In certain embodiments, the collector is grounded. In some embodiments, the tube 112 has a circular, elliptical, square, or other suitable cross-sectional shape.

Also provided herein is an electrospinning apparatus for forming nanofibers, the apparatus comprising: a first conduit having a first supply end and a first nozzle end, the first conduit being suitable to express a liquid polymer; at least one gas supply conduit disposed in proximity to the first conduit, the gas supply conduit having a second supply end and a second nozzle end; and a high pressure gas system suitable for expelling high velocity gas from the second nozzle end. In some embodiments, the high pressure gas system comprises a pump, a high pressure gas canister, and/or a tapered gas supply conduit such that the second nozzle end is narrower than the second supply end. In certain embodiments, the gas supply conduit comprises a plurality of second nozzle ends.

In some embodiments, the first nozzle end 122 and the second nozzle end 132 are located on the same end of the longitudinal axis 126. In certain embodiments, the first nozzle end and the second nozzle end 132 are in the same axial position along the longitudinal axis. In some embodiments, the first nozzle end 122 and the second nozzle end 132 are offset along the longitudinal axis. In certain embodiments, the first nozzle end 122 is closer to the supply end than the second nozzle end 132. In other embodiments, the second nozzle end 132 is closer to the supply end than the first nozzle end 122. In certain embodiments, the first nozzle end 122 and the second nozzle end 132 are offset from each other by any suitable amount, e.g., about 0.1 μm, by about 0.2 μm, by about 0.5 μm, by about 0.8 μm, by about 1.0 μm, by about 1.5 μm, by about 2.0 μm, by about 2.5 μm, by about 3.0 μm, by about 3.5 μm, by about 4.0 μm, by about 4.5 μm, by about 5.0 μm, by about 5.5 μm, by about 6 μm, by about 7 μm, by about 8 μm, by about 9 μm, by about 10 μm, by about 15 μm, by about 20 μm, by about 0.01 μm to about 100 μm, or about 0.1 μm to about 20 μm.

In certain embodiments, the high velocity gas stream 136 is comprised of air. In some embodiments, the high velocity gas stream 136 essentially consists of air. In certain embodiments, the high velocity gas stream 136 is comprised of an inert gas. In other embodiments, the high velocity gas stream 136 consists essentially of an inert gas. An inert gas includes, but is not limited to, nitrogen, helium, argon, neon, other noble gases, or carbon dioxide. In some embodiments, the high velocity gas stream 136 comprises the vapor of a solvent. In other embodiments, the high velocity gas stream 136 comprises the vapors of a reagent. In certain embodiments, the solvent or reagent vapor affects the surface characteristics of the product nanofiber. In some embodiments, the solvent or reagent vapor adds functionality to the product nanofiber. In certain embodiments, the solvent or reagent vapor causes in-situ cross-linking of the liquid polymer jet and/or the hardened nanofiber. In some embodiments, the solvent or reagent vapor coats the liquid polymer jet and/or the hardened nanofiber. In certain embodiments, the solvent or reagent vapor provides for doping of the liquid polymer jet and/or the hardened nanofiber.

In some embodiments, the gas stream velocity (or high velocity gas stream velocity) is greater than 0.1 m/s, or greater than 1 m/s, or in the range of 1 m/s to 300 m/s. In certain embodiments, the gas stream velocity is about 0.1 m/s, about 0.2 m/s, about 0.5 m/s, about 1.0 m/s, about 2.0 m/s, about 5.0 m/s, about 10 m/s, about 15 m/s, about 20 m/s, about 25 m/s, about 30 m/s, about 35 m/s, about 40 m/s, about 45 m/s, about 50 m/s, about 75 m/s, about 100 m/s, about 150 m/s, about 200 m/s, about 250 m/s, about 300 m/s, or about 350 m/s. In some embodiments, the gas stream velocity if between 100 m/s and 350 m/s. In other embodiments, the gas stream velocity is between 200 m/s and 300 m/s. In certain embodiments, the gas stream velocity is between 250 m/s and 350 m/s. In some embodiments, the high velocity gas stream provides additional drag force on the liquid polymer jet surface. In certain embodiments, the high velocity gas stream additionally thins the liquid polymer jet.

In certain embodiments, the electrospinning apparatus 110 further comprises a heating system 116 for the high velocity gas stream 136. The heater 116 is used to adjust the temperature of the high velocity gas stream. In certain embodiments, the temperature of the high velocity gas stream is adjusted to maintain a high temperature at the nozzle for the liquid polymer and keep the polymer in liquid form. In some embodiments, the temperature and/or gas stream velocity are adjusted to eliminate enhanced cooling by electrohydrodynamically induced air flow near the nozzle and polymer jet, whereby rapid quenching of the polymer jet is prevented.

In some embodiments, the high velocity gas stream temperature is greater than 293K, greater than 313K, greater than 333K, greater than 353K, greater than 373K, or in the range of 313K to 523K. In certain embodiments, the gas stream temperature is about 293K, about 303K, about 313K, about 323K, about 333K, about 343K, about 353K, about 363K, about 373K, about 383K, about 393K, about 403K, about 413K, about 423K, about 433K, about 443K, about 453K, about 463K, about 473K, about 483K, about 493K, about 503K, about 513K, about 523K, about 533K, about 543K, about 553K, about 563K, about 573K, about 623K, about 673K, about 723K, or about 773K. In some embodiments, the high velocity gas stream temperature is between 473 k and 673K. In certain embodiments, the high velocity gas stream temperature is between 373K and 573K. In other embodiments, the high velocity gas stream temperature is between 323K and 473K.

In certain embodiments, the electrospinning apparatus 110 further comprises a second heater 142 for the liquid polymer. In some embodiments, the heater 142 for the liquid polymer is adjusted to maintain the temperature and/or control the viscosity of the liquid polymer.

GASE—Outside Gas Stream

Figure 4:
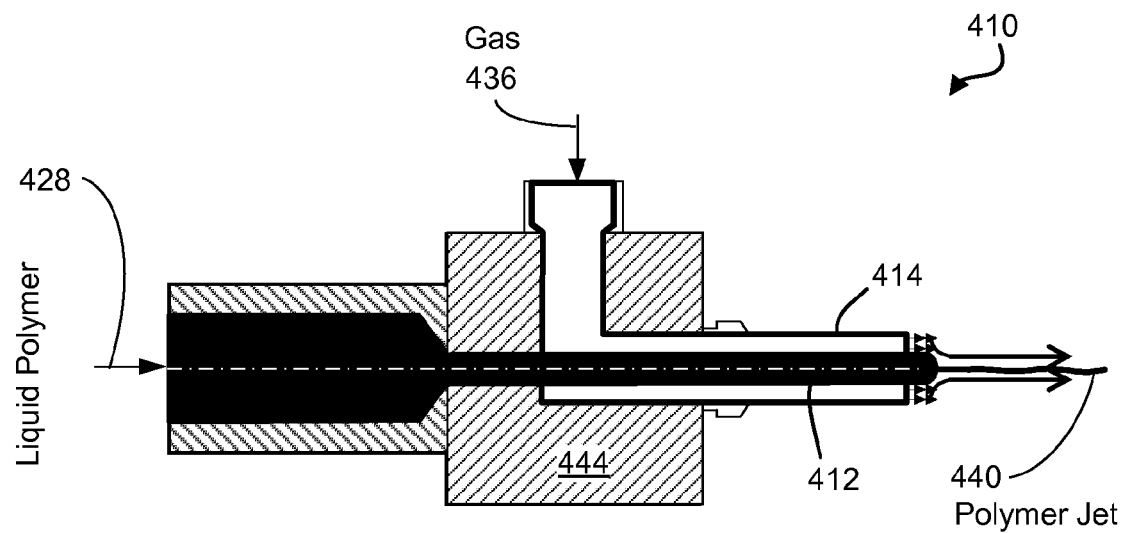
FIG. 4 shows a schematic of the spinneret for use in the gas-assisted solution electrospinning (GASE) process with an outer channel for temperature modulated gas supply.

In another aspect, a gas assisted electrospinning apparatus 410 comprises an outer channel 414 configured to pass a high velocity gas stream 436 and an inner channel 412 to pass a liquid polymer solution 428. For instance, a gas assisted electrospinning apparatus for liquid polymer is arranged as shown in FIG. 4.

In certain embodiments, the electrospinning apparatus 410 further comprises a heater (not shown) for the high velocity gas stream 436. The heater is used to adjust the temperature of the high velocity gas stream. In some embodiments, the heated high velocity gas stream enhances evaporation of a solvent. In certain embodiments, the temperature of the high velocity gas stream is adjusted to maintain a high temperature at the nozzle for the liquid polymer solution and keep the polymer in solution. In some embodiments, the temperature and/or gas stream velocity are adjusted to eliminate enhanced cooling by electrohydrodynamically induced air flow near the nozzle and polymer jet, whereby rapid quenching of the polymer jet is prevented.

In other embodiments, the electrospinning apparatus 410 further comprises a cooler 444 for the high velocity gas stream 436. The cooler 444 is used to adjust the temperature of the high velocity gas stream. In some embodiments, the cooled high velocity gas stream is adjusted to suppress solvent evaporation. In certain embodiments, suppressing solvent evaporation prevents premature solidification of the liquid polymer solution.

Figure 3:
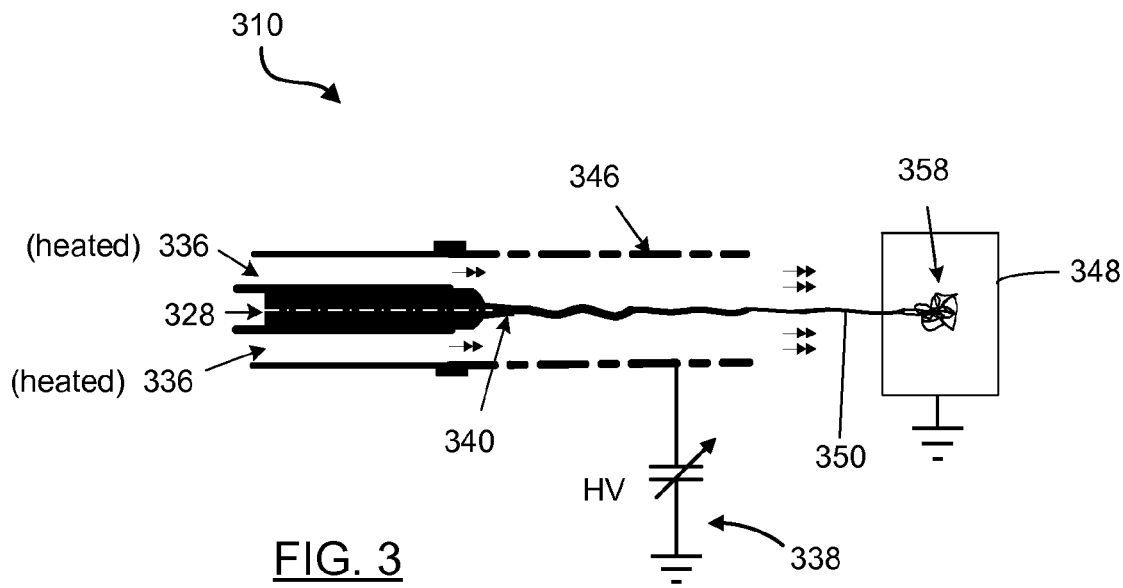
FIG. 3 shows a schematic of the GAME system with a guide tube to guide the polymer melt to a designated place.
Figure 6:
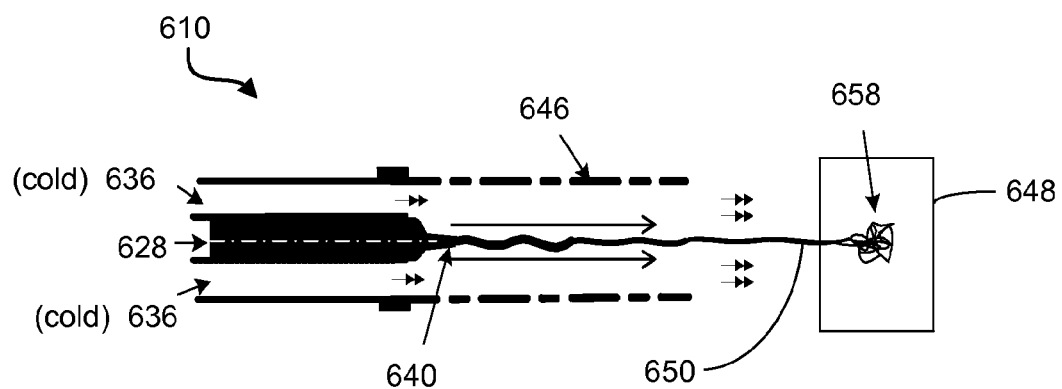
FIG. 6 shows a schematic of the GASE system with a guide tube to guide the polymer solution jet to a designated place.

In another embodiment, any gas-assisted electrospinning apparatus described herein further comprises a guide channel. For instance, a gas assisted electrospinning apparatus 310, 610 with a guide channel 346, 646 is arranged as shown in FIG. 3 or FIG. 6. In some embodiments, the guide channel of any apparatus described herein surrounds the liquid polymer jet. In certain embodiments, the guide channel surrounds a liquid polymer jet 340, 640 which is surrounded by a gas stream. In some embodiments, the gas stream 336 is heated. In other embodiments, the gas stream 636 is cooled. The guide channel guides the polymer jets during the spinning to a desired target. In some embodiments, the electrospinning apparatus 310, 610 comprises a collector 348, 648 positioned to capture hardened nanofibers 350, 650 formed from the charged liquid polymer jet 340, 640. In certain embodiments, the collector is grounded.

In some embodiments, the gas assisted electrospinning apparatus produces nano- and microfibers of polymers. A liquid polymer described herein can comprise a polymer or a polymer melt. The liquid polymer comprises any suitable polymer for the intended purpose of the product fiber. The liquid polymer is optionally biodegradable or non-biodegradable. In some embodiments, the polymer is a meltable thermoplastic polymer. Thermoplastic polymers include, but are not limited to, amorphous polymers such as rubber, polycarbonate, polystyrene and poly(methyl methacrylate); slow crystallizing polymers such as poly(lactic acid) (PLA); medium crystallizing polymers such as polyethylene terephthalate, fast crystallizing polymers such as polybutylene terephthalate, nylon 6, polypropylene and polyethylene; and very fast crystallizing polymers such as nylon 6,6. In certain embodiments, the polymer is soluble. In some embodiments, the polymer is only soluble at elevated temperature, such as polyolefines or polyethylene terephthalate.

In certain embodiments, the nano- and microfibers produced with the gas assisted electrospinning apparatus have a diameter of 50 nm to 10 µm. In some embodiments, the diameter of the nanofiber is about 10 nm, about 20 nm, about 30 nm, about 40 nm, about 50 nm, about 60 nm, about 70 nm, about 80 nm, about 90 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1 μm, about 2 μm, about 3 μm, about 4 μm, about 5 μm, about 6 μm, about 7 μm, about 8 μm, about 9 μm, about 10 μm, about 20 μm, or about 30 μm. In certain embodiments, the nano- and microfibers have a diameter of about 100 nm to about 1 μm. In some embodiments, the nano- and microfibers have a diameter of about 200 nm to about 5 μm.

GAME—Inside Gas Stream

In a further aspect, a gas assisted electrospinning apparatus comprises an inner channel configured to pass a high velocity gas stream and an outer channel to pass a liquid polymer. In certain embodiments, the liquid polymer is a molten liquid polymer. In some embodiments, the molten liquid polymer further comprises a solvent. For instance, a gas assisted electrospinning apparatus for liquid polymer is arranged as shown in FIG. 2.

Figure 2:
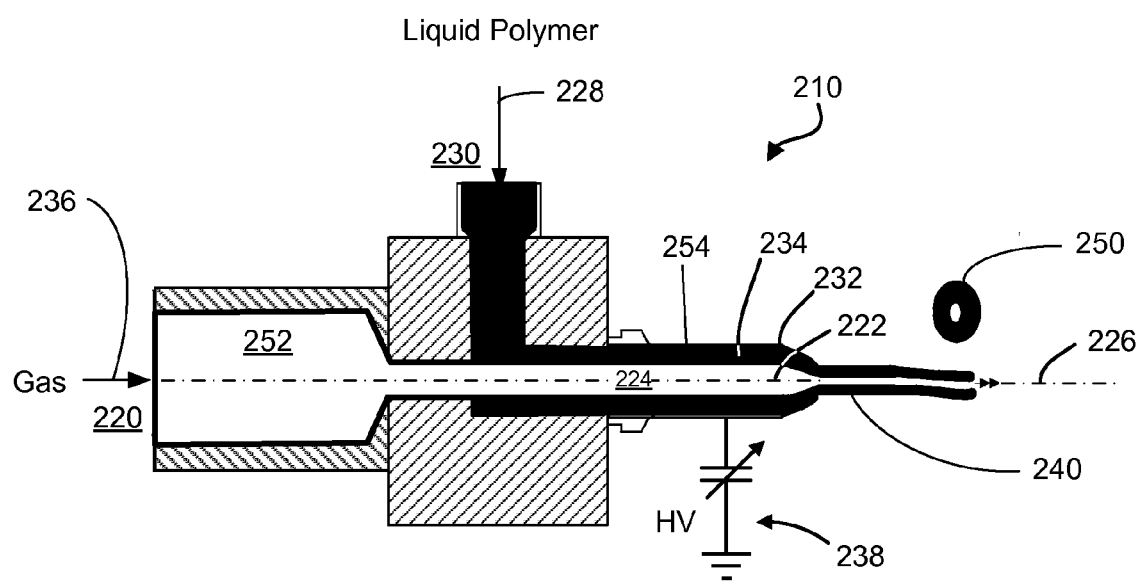
FIG. 2 shows a schematic of a spinneret for use in the GAME process with an inner channel for heated gas supply.

Provided herein is an electrospinning apparatus 210 for forming nanofibers according to FIG. 2, comprising a center tube 252 having a first supply end 220 and an opposing first nozzle end 222, the center tube 252 defining a center chamber 224 along a longitudinal axis 226, the center chamber adapted to provide a high velocity gas steam 236; a polymer-feeding tube 254 disposed in surrounding relation to the center tube 252, the polymer-feeding tube having a second supply end 230 and an opposing second nozzle end 232, the polymer-feeding tube defining an outer chamber 234 along the longitudinal axis 226, the outer chamber adapted to provide a polymer liquid 228; a voltage supply 238 proximate to the polymer-feeding tube 254, the voltage supply adapted to impart an electrical charge to the liquid polymer so as to form a charged liquid polymer jet. In some embodiments, the electrospinning apparatus 210 further comprises a collector (not shown) positioned to capture hardened nanofibers 250 formed from the charged liquid jet 240. In certain embodiments, the collector is grounded. In some embodiments, the tube 254 has a circular, elliptical, square, or other suitable cross-sectional shape.

GASE—Inside Gas Stream

Figure 5:
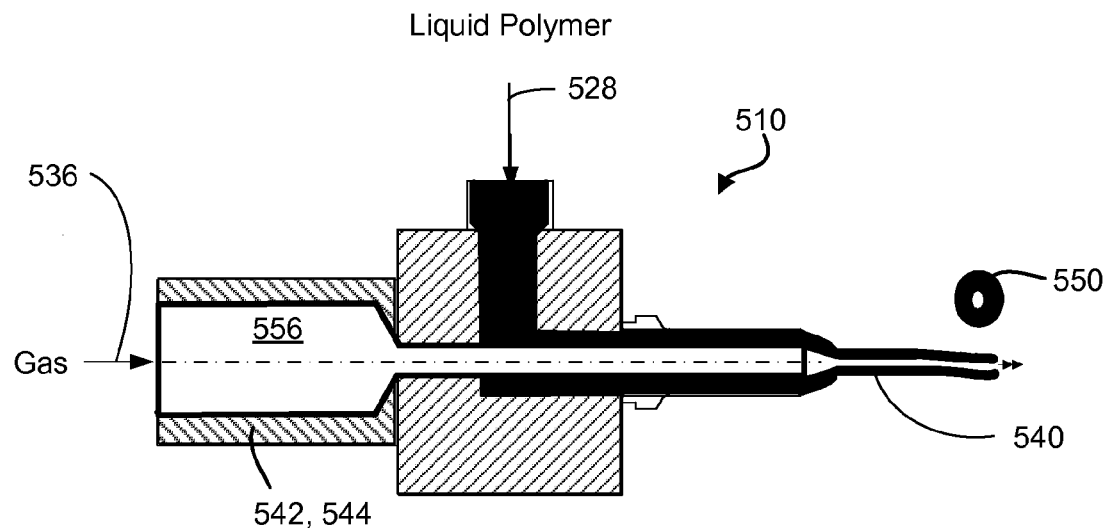
FIG. 5 shows a schematic of the spinneret for use in the GASE process with an inner channel for temperature modulated gas supply.

In yet another aspect, a gas assisted electrospinning apparatus comprises an inner channel configured to pass a modulated temperature gas stream and an outer channel to pass a liquid polymer solution. For instance, a gas assisted electrospinning apparatus 510 for liquid polymer solution 528 is arranged as shown in FIG. 5. In some embodiments, a gas assisted electrospinning apparatus comprising an inner modulated temperature channel 556 produces nano- and microfibers 550 that are hollow. In other embodiments, the nano- and microfibers 550 comprise hollow sections.

In certain embodiments, the electrospinning apparatus 510 further comprises a heater 542 for the modulated temperature gas stream 536. The heater 542 is used to adjust the temperature of the modulated temperature gas stream. In some embodiments, the heated modulated temperature gas stream enhances evaporation of a solvent. In certain embodiments, the temperature of the modulated temperature gas stream is adjusted to maintain a high temperature at the nozzle for the liquid polymer solution 528 and keep the polymer in solution.

In other embodiments, the electrospinning apparatus 510 further comprises a cooler 544 for the modulated temperature gas stream. The cooler 544 is used to adjust the temperature of the modulated temperature gas stream. In some embodiments, the cooled modulated temperature gas stream is adjusted to suppress solvent evaporation. In certain embodiments, suppressing solvent evaporation prevents premature solidification of the liquid polymer solution.

In a further aspect, the electrospinning apparatus comprises an inner channel configured to pass a liquid stream and an outer channel to pass a liquid polymer. In certain embodiments, the liquid polymer is a molten liquid polymer. In some embodiments, the molten liquid polymer further comprises a solvent. In other embodiments, the liquid polymer is a liquid polymer solution. In certain embodiments, the liquid stream comprises a solvent. In some embodiments, the liquid stream comprises a second liquid polymer solution or second liquid polymer melt. In certain embodiments, the product polymer nanofiber comprises a core comprised of a second polymer. In some embodiments, the second polymer is removed thermally or chemically to create a hollow nanofiber.

In certain embodiments, the hollow nano- and microfibers produced with the gas assisted electrospinning apparatus are hollow and have a diameter of 500 nm to 10 μm. In some embodiments, the diameter of the hollow nanofiber is about 50 nm, about 60 nm, about 70 nm, about 80 nm, about 90 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1 μm, about 2 μm, about 3 μm, about 4 μm, about 5 μm, about 6 μm, about 7 μm, about 8 μm, about 9 μm, about 10 μm, about 20 μm, or about 30 μm. In certain embodiments, the hollow nano- and microfibers have a diameter of about 1 μm to about 10 μm. In some embodiments, the nano- and microfibers have a diameter of about 2 μm to about 30 μm.

Spinnerets

In another aspect, a gas assisted electrospinning apparatus comprises a spinneret having two or more channels of gas jet devices. One of the advantages of the present invention is that gas assisted electrospinning allows the close packing of spinnerets, thereby enabling nanofibers to be deposited substantially faster and with more control over their orientation and mix. In some embodiments, the gas assisted electrospinning apparatus comprises more liquid polymer channels than gas stream channels. In other embodiments, the gas assisted electrospinning apparatus comprises more gas stream channels than liquid polymer channels.

Electrospinning Processes

In a further aspect, provided herein is a process for preparing a nanofiber, the process comprising electrospinning a liquid polymer with a high velocity gas. In some embodiments, the liquid polymer surrounds the high velocity gas. In other embodiments, the high velocity gas surrounds or envelopes the liquid polymer. In certain embodiments, the high velocity gas is heated. In other embodiments, the high velocity gas is cooled. In further embodiments, the high velocity gas is at room temperature. In some embodiments, the liquid polymer is a neat polymer melt of a polymer solution. In certain embodiments, the high velocity gas comprises a vapor of a solvent or reagent.

In another aspect, a process for preparing a nanofiber comprises injecting a charged liquid polymer into a high velocity gas stream. In some embodiments, the charged liquid polymer forms a jet. In certain embodiments, the liquid polymer is a neat polymer melt or a polymer solution. In some embodiments, the high velocity gas stream surrounds the charged liquid polymer. In some embodiments, the high velocity gas stream is heated. In certain embodiments, the high velocity gas stream comprises a solvent or a reagent. In some embodiments, the high velocity gas stream comprises a vapor of a solvent or a reagent. In further embodiments, the high velocity gas stream is confined within a guide channel. In some embodiments, the guide channel guides the nanofiber jet to a desired location on a collector plate.

Figure 7:
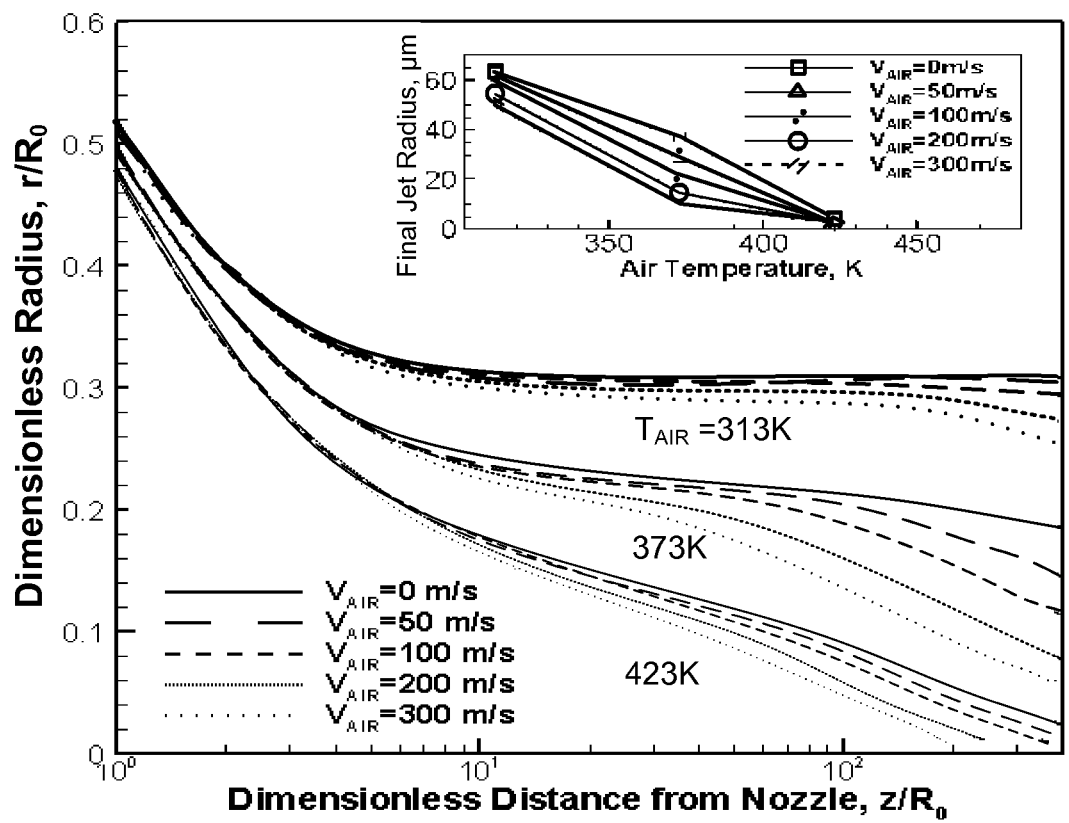
FIG. 7 shows the effects of the heating air velocity and temperature on jet attenuation in PLA melt electrospinning ($V_{AIR}$ and $T_{AIR}$ do not change with axial position (z), and B=0.6).

In a further aspect, an electrospinning process comprises generating a liquid polymer jet, wherein the liquid polymer jet continuously attenuates (e.g., as illustrated in the 373K and 423K traces of FIG. 7). In some embodiments, the liquid polymer jet continuously attenuates from an electrospinning nozzle to a collector plate. In certain embodiments, the temperature of the liquid polymer jet changes less than 1K, less than 2K, less than 5K, less than 10K, less than 20K, less than 30K, less than 40K, less than 50K, less than 75K, or less than 100K from the electrospinning nozzle to a collector plate.

Gas-Assisted Electrospinning Parameters

In some embodiments of any gas-assisted electrospinning apparatus or process described herein, the first nozzle end and the second nozzle end are located on the same end of the longitudinal axis. In certain embodiments, the first nozzle end and the second nozzle end are in the same axial position along the longitudinal axis. In some embodiments, the first nozzle end and the second nozzle end are offset along the longitudinal axis. In certain embodiments, the first nozzle end is closer to the supply end than the second nozzle end. In other embodiments, the second nozzle end is closer to the supply end than the first nozzle end. In certain embodiments, the first nozzle end and the second nozzle are offset from each other by about 0.1 µm, by about 0.2 µm, by about 0.5 µm, by about 0.8 µm, by about 1.0 µm, by about 1.5 µm, by about 2.0 µm, by about 2.5 µm, by about 3.0 µm, by about 3.5 µm, by about 4.0 µm, by about 4.5 µm, by about 5.0 µm, by about 5.5 µm, by about 6 µm, by about 7 µm, by about 8 µm, by about 9 µm, by about 10 µm, by about 15 µm, or by about 20 µm. In some embodiments, the first nozzle and the second nozzle are offset from each other by less than 0.1 µm, by less than 0.2 µm, by less than 0.5 µm, by less than 0.8 µm, by less than 1.0 µm, by less than 1.5 µm, by less than 2.0 µm, by less than 2.5 µm, by less than 3.0 µm, by less than 3.5 µm, by less than 4.0 µm, by less than 4.5 µm, by less than 5.0 µm, by less than 5.5 µm, by less than 6 µm, by less than 7 µm, by less than 8 µm, by less than 9 µm, by less than 10 µm, by less than 15 µm, or by less than 20 µm. In certain embodiments, the first nozzle and the second nozzle are offset from each other by more than 0.1 µm, by more than 0.2 µm, by more than 0.5 µm, by more than 0.8 µm, by more than 1.0 µm, by more than 1.5 µm, by more than 2.0 µm, by more than 2.5 µm, by more than 3.0 µm, by more than 3.5 µm, by more than 4.0 µm, by more than 4.5 µm, by more than 5.0 µm, by more than 5.5 µm, by more than 6 µm, by more than 7 µm, by more than 8 µm, by more than 9 µm, by more than 10 µm, by more than 15 µm, or by more than 20 µm.

In certain embodiments of any gas-assisted electrospinning apparatus or process described herein, the gas stream is comprised of air. In some embodiments, the gas stream essentially consists of air. In certain embodiments, the gas stream is comprised of an inert gas. In other embodiments, the gas stream consists essentially of an inert gas. An inert gas includes, but is not limited to, nitrogen, helium, argon, neon, other noble gases, or carbon dioxide. In some embodiments, the gas stream comprises the vapor of a solvent. In other embodiments, the gas stream comprises the vapors of a reagent. In other embodiments, the gas stream comprises a nebulized solvent or reagent. In certain embodiments, the solvent or reagent affects the surface characteristics of the product nanofiber. In some embodiments, the solvent or reagent adds functionality to the product nanofiber. In certain embodiments, the solvent or reagent causes in-situ cross-linking of the liquid polymer jet and/or the hardened nanofiber. In some embodiments, the solvent or reagent changes the morphology of the product fiber. In certain embodiments, the solvent or reagent changes the surface morphology of the product fiber. In other embodiments, solvents or reagents in the gas stream are used to tune the morphology of the product fiber. In some embodiments, the solvent or reagent coats the liquid polymer jet and/or the hardened nanofiber. In certain embodiments, the solvent or reagent provides for doping of the liquid polymer jet and/or the hardened nanofiber. In some embodiments, a fiber is cross-linked by the solvent or reagent in the gas stream.

In some embodiments of any gas-assisted electrospinning apparatus or process described herein, the gas stream velocity is in the range of 1 m/s to 300 m/s. In certain embodiments, the gas stream velocity is about 0.01 m/s, about 0.02 m/s, about 0.05 m/s, about 0.1 m/s, about 0.2 m/s, about 0.5 m/s, about 1.0 m/s, about 2.0 m/s, about 5.0 m/s, about 10 m/s, about 15 m/s, about 20 m/s, about 25 m/s, about 30 m/s, about 35 m/s, about 40 m/s, about 45 m/s, about 50 m/s, about 75 m/s, about 100 m/s, about 150 m/s, about 200 m/s, about 250 m/s, about 300 m/s, or about 350 m/s. In some embodiments, the gas stream velocity if between 100 m/s and 350 m/s. In some embodiments, the gas stream velocity is greater than 0.01 m/s, greater than 0.02 m/s, greater than 0.05 m/s, greater than 0.1 m/s, greater than 0.2 m/s, greater than 0.5 m/s, greater than 1.0 m/s, greater than 2.0 m/s, greater than 5.0 m/s, greater than 10 m/s, greater than 15 m/s, greater than 20 m/s, greater than 25 m/s, greater than 30 m/s, greater than 35 m/s, greater than 40 m/s, greater than 45 m/s, greater than 50 m/s, greater than 75 m/s, greater than 100 m/s, greater than 150 m/s, greater than 200 m/s, greater than 250 m/s, greater than 300 m/s, or greater than 350 m/s. In certain embodiments, the gas stream velocity is less than 0.01 m/s, less than 0.02 m/s, less than 0.05 m/s, less than 0.1 m/s, less than 0.2 m/s, less than 0.5 m/s, less than 1.0 m/s, less than 2.0 m/s, less than 5.0 m/s, less than 10 m/s, less than 15 m/s, less than 20 m/s, less than 25 m/s, less than 30 m/s, less than 35 m/s, less than 40 m/s, less than 45 m/s, less than 50 m/s, less than 75 m/s, less than 100 m/s, less than 150 m/s, less than 200 m/s, less than 250 m/s, less than 300 m/s, or less than 350 m/s. In some embodiments, the gas stream velocity if between 100 m/s and 350 m/s. In other embodiments, the gas stream velocity is between 200 m/s and 300 m/s. In certain embodiments, the gas stream velocity is between 250 m/s and 350 m/s. In other embodiments, the gas stream velocity is between 1 m/s and 100 m/s. In certain embodiments, the gas stream velocity is between 5 m/s and 50 m/s. In some embodiments, the high velocity gas stream provides additional drag force on the liquid polymer jet surface. In certain embodiments, the high velocity gas stream additionally thins the liquid polymer jet. In some embodiments, a high velocity gas stream has a velocity of at least 1.0 m/s, at least 2.0 m/s, at least 5.0 m/s, at least 10 m/s, at least 15 m/s, at least 20 m/s, at least 25 m/s, at least 30 m/s, at least 35 m/s, at least 40 m/s, at least 45 m/s, at least 50 m/s, at least 75 m/s, at least 100 m/s, at least 150 m/s, at least 200 m/s, at least 250 m/s, or at least 300 m/s. In certain embodiments, a high velocity gas stream has a velocity of about 10 m/s to about 500 m/s, about 10 m/s to about 400 m/s, about 20 m/s to about 400 m/s, about 10 m/s to about 300 m/s, or the like.

In certain embodiments of any gas-assisted electrospinning apparatus or process described herein, the electrospinning apparatus further comprises a heater for the gas stream. The heater is used to adjust the temperature of the gas stream. In certain embodiments, the temperature of the high velocity gas stream is adjusted to maintain a high temperature at the nozzle and keep the polymer in liquid form, by keeping a polymer melted and/or in solution. In other embodiments, the heater for the gas stream is adjusted to reduce the viscosity of the liquid polymer at the nozzle compared to the liquid polymer in the supply chamber. In certain embodiments, the heater for the gas stream is adjusted to increase the viscosity of the liquid polymer at the nozzle. In some embodiments, the temperature and/or gas stream velocity are adjusted to eliminate enhanced cooling by electrohydrodynamically induced airflow near the nozzle and polymer jet, whereby rapid quenching of the polymer jet is prevented. In some embodiments, the heated high velocity gas stream enhances evaporation of a solvent.

In other embodiments of any gas-assisted electrospinning apparatus or process described herein, the electrospinning apparatus further comprises a cooler for the gas stream. The cooler is used to adjust the temperature of the gas stream. In some embodiments, the cooled gas stream is adjusted to suppress solvent evaporation. In certain embodiments, suppressing solvent evaporation prevents premature solidification of the liquid polymer solution.

In some embodiments of any gas-assisted electrospinning apparatus or process described herein, the gas stream temperature is in the range of 313K to 523K. In certain embodiments, the gas stream temperature is about 243K, about 253K, about 263K, about 273K, about 283K, about 293K, about 303K, about 313K, about 323K, about 333K, about 343K, about 353K, about 363K, about 373K, about 383K, about 393K, about 403K, about 413K, about 423K, about 433K, about 443K, about 453K, about 463K, about 473K, about 483K, about 493K, about 503K, about 513K, about 523K, about 533K, about 543K, about 553K, about 563K, about 573K, about 623K, about 673K, about 723K, or about 773K. In some embodiments, the gas stream temperature is above 243K, above 253K, above 263K, above 273K, above 283K, above 293K, above 303K, above 313K, above 323K, above 333K, above 343K, above 353K, above 363K, above 373K, above 383K, above 393K, above 403K, above 413K, above 423K, above 433K, above 443K, above 453K, above 463K, above 473K, above 483K, above 493K, above 503K, above 513K, above 523K, above 533K, above 543K, above 553K, above 563K, above 573K, above 623K, above 673K, above 723K, or above 773K. In other embodiments, the gas stream temperature is below 243K, below 253K, below 263K, below 273K, below 283K, below 293K, below 303K, below 313K, below 323K, below 333K, below 343K, below 353K, below 363K, below 373K, below 383K, below 393K, below 403K, below 413K, below 423K, below 433K, below 443K, below 453K, below 463K, below 473K, below 483K, below 493K, below 503K, below 513K, below 523K, below 533K, below 543K, below 553K, below 563K, below 573K, below 623K, below 673K, below 723K, or below 773K. In some embodiments, the gas stream temperature is between 473 k and 673K. In certain embodiments, the gas stream temperature is between 373K and 573K. In other embodiments, the gas stream temperature is between 323K and 473K. In some embodiments, the gas stream temperature is between 243K and 293K. In certain embodiments, the gas stream temperature is room temperature.

In certain embodiments of any gas-assisted electrospinning apparatus or process described herein, the electrospinning apparatus further comprises a heater for the liquid polymer, which is a liquid polymer melt or liquid polymer solution. In some embodiments, the heater is adjusted to maintain the temperature of a liquid polymer solution to keep the polymer in solution. In other embodiments, the heater controls the viscosity of the liquid polymer.

In some embodiments of any gas-assisted electrospinning apparatus or process described herein, the gas assisted electrospinning apparatus produces nano- and microfibers of polymers. A liquid polymer described herein can comprise a polymer or a polymer melt. The liquid polymer comprises any suitable polymer for the intended purpose of the product fiber. The liquid polymer is optionally biodegradable or non-biodegradable. In some embodiments, the polymer is a meltable thermoplastic polymer. Thermoplastic polymers include, but are not limited to, amorphous polymers such as rubber, polycarbonate, polystyrene and poly(methyl methacrylate); slow crystallizing polymers such as poly(lactic acid) (PLA); medium crystallizing polymers such as polyethylene terephthalate, fast crystallizing polymers such as polybutylene terephthalate, nylon 6, polypropylene and polyethylene; and very fast crystallizing polymers such as nylon 6,6. In certain embodiments, the polymer is soluble. In some embodiments, the polymer is only soluble at elevated temperature, such as polyolefines or polyethylene terephthalate. In certain embodiments, a liquid polymer comprises a protein-based solution, which comprises a protein and/or peptidic component. Examples of the protein component include soy-based materials such as soy-protein concentrate, soy flours, and/or soy-protein isolates. Other protein components come from sources of protein such as whey, gluten, zein, albumin, gelatin, and others. In some embodiments, the proteins are from an animal source or a plant source. In certain embodiments, the protein component is a proteoglycan. In some embodiments, the protein-based solution comprises a carrier polymer. Examples of carrier polymers include, but are not limited to, polyvinyl alcohol, polyethylene oxide, or polyethylene glycol. In further embodiments of any gas-assisted electrospinning apparatus described herein, the liquid polymer can also comprise supplemental components or solutions. In various embodiments, such supplemental components or solutions can be used to modify aspects of the resulting fibers, like moisture resistance, moisture sensitivity, stiffness, tensile strength. Supplemental components or solutions comprise, but are not limited to, fatty acids, micro-scale and nano-scale particulates such as titanium oxide, nano-clay, nanocrystalline cellulose, cellulose nanocrystals, nanofibrillated cellulose, bio-char, pH modifiers, surfactants, or antimicrobial agents.

Nanofibers

In another aspect, provided herein are fibers prepared using any apparatus or according to any described herein.

In one aspect, provided herein is a fiber comprising a polymer, wherein the fiber is hollow. In some embodiments, the polymer fiber defines a hollow space along the longitudinal axis of the fiber. In certain embodiments, the whole fiber is hollow. In other embodiments, only a portion of the fiber is hollow. In some embodiments, the hollows are bubbles. In certain embodiments, about 0.1%, about 0.2%, about 0.5%, about 1%, about 2%, about 5%, about 10%, about 15%, about 20%, about 25%, about 30%, about 40%, about 50%, about 60%, about 70%, about 80%, about 90%, about 95%, about 98%, about 99%, or about 100% of the fiber is hollow. In some embodiments, less than 0.1%, less than 0.2%, less than 0.5%, less than 1%, less than 2%, less than 5%, less than 10%, less than 15%, less than 20%, less than 25%, less than 30%, less than 40%, less than 50%, less than 60%, less than 70%, less than 80%, less than 90%, less than 95%, less than 98%, less than 99%, or less than 100% of the fiber is hollow. In certain embodiments, more than 0.1%, more than 0.2%, more than 0.5%, more than 1%, more than 2%, more than 5%, more than 10%, more than 15%, more than 20%, more than 25%, more than 30%, more than 40%, more than 50%, more than 60%, more than 70%, more than 80%, more than 90%, more than 95%, more than 98%, more than 99%, or more than 100% of the fiber is hollow. In some embodiments, between 5% and 50% of the fiber is hollow. In certain embodiments, 60% to 90% of the fiber is hollow.

Also provided herein is a solvent free fiber, wherein the fiber has a diameter of less than 1 μm. In some embodiments, a fiber is solvent free. In certain embodiments, a fiber is essentially solvent free. IN some embodiments, a solvent free fiber contains less than 30% solvent, less than 25% solvent, less than 20% solvent, less than 15% solvent, less than 10% solvent, less than 7% solvent, less than 5% solvent, less than 2% solvent, less than 1% solvent, less than 0.5% solvent, less than 0.2% solvent, or less than 0.1% solvent.

Further provided herein is a melt electrospun fiber, wherein the melt electrospun fiber has a diameter of less than 1 μm. A melt electrospun fiber is a fiber produced with any electrospinning apparatus.

Also provided herein is a low solvent or solvent free (e.g., wherein the fiber comprises low amounts of or is free of organic solvents and/or water). In specific instances, provided herein is a nanofiber electrospun from an aqueous solution, wherein the fiber has a low water content. In some embodiments, the morphology of a low water content fiber does not change when collecting. In certain embodiments, a low water content fiber does not aggregate (e.g., does not stick to, fuse with, or bond to other fibers when collected, which may occur when water soluble polymers are electrospun without a suitable procedure for drying the polymer jet). does. In some embodiments, a low water content fiber has less than 30% water, less than 25% water, less than 20% water, less than 15% water, less than 10% water, less than 7% water, less than 5% water, less than 2% water, less than 1% water, less than 0.5% water, less than 0.2% water, or less than 0.1% water. In some embodiments, collected nanofibers (e.g., nanofibers electrospun from an aqueous liquid polymer solution) comprise a low water content and a uniform or substantially uniform morphology.

In certain embodiments of any fiber described herein or produced with any gas-assisted electrospinning apparatus or any process described herein, the fiber preferably has a diameter of less than 1 μm. In some embodiments, the diameter of the fiber is about 10 nm, about 20 nm, about 30 nm, about 40 nm, about 50 nm, about 60 nm, about 70 nm, about 80 nm, about 90 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1 μm, about 2 μm, about 3 μm, about 4 μm, about 5 μm, about 6 μm, about 7 μm, about 8 μm, about 9 μm, about 10 μm, about 20 μm, or about 30 μm. In certain embodiments, the fiber has a diameter of about 100 nm to about 1 μm. In some embodiments, the fiber has a diameter of about 200 nm to about 5 μm. The diameter of a fiber can be a mean diameter of the fibers in a fiber mat, or the diameter of a fiber can be the median of the diameter of the fibers in a fiber mat. In some instances, the diameter of a fiber is measured in the middle section of a fiber, in some instances at the ends of the fiber. In some instances, the diameter of the fiber is measured in several sections of a fiber.

In some embodiments of any fiber described herein or produced with any gas assisted electrospinning apparatus or any process described herein, a plurality of fibers is collected (e.g., on the collector plate of an electrospinning apparatus) in the form of fiber mats. In some embodiments, the fiber mats, for example the fiber mats 358, 658 illustrated in FIGS. 3 and 6 respectively, comprise a plurality of any fibers described herein or produced with any gas-assisted electrospinning apparatus of any process described herein. In certain embodiments, a guide tube or guide channel is used to guide the fibers to the collector to form organized fiber mats. In other embodiments, the random whipping motion of electrospinning forms as-spun fiber mats at the collector. In some embodiments, the fibers in a fiber mat are not aggregated or agglomerated. Agglomeration or Aggregation includes the sticking of fibers to each other (e.g., along the longitudinal axis of a fiber or portions of fiber stick to another fiber at any angle). In some embodiments, the morphology of agglomerated or aggregated fibers changes. In certain embodiments, less than 10% of the fibers in a fiber mat are agglomerated or aggregated. In some embodiments, the aggregation or agglomeration of fibers in a fiber mat is less than 50%, less than 40%, less than 30%, less than 25%, less than 20%, less than 15%, less than 10%, less than 5%, less than 2%, or less than 1%.

In certain embodiments of any fiber described herein or produced with any gas-assisted electrospinning apparatus or any process described herein, the nano- and microfibers comprise a polymer. The polymer comprises any suitable polymer for the intended purpose of the product fiber. The polymer is optionally biodegradable or non-biodegradable. In some embodiments, the polymer is a meltable thermoplastic polymer. Thermoplastic polymers include, but are not limited to, amorphous polymers such as rubber, polycarbonate, polystyrene and poly(methyl methacrylate); slow crystallizing polymers such as poly(lactic acid) (PLA); medium crystallizing polymers such as polyethylene terephthalate, fast crystallizing polymers such as polybutylene terephthalate, nylon 6, polypropylene and polyethylene; and very fast crystallizing polymers such as nylon 6,6. In certain embodiments, the polymer is soluble. In some embodiments, the polymer is only soluble at elevated temperature, such as polyolefines or polyethylene terephthalate. In certain embodiments, a liquid polymer starting material comprises a protein-based solution, which comprises a protein and/or peptidic component. As a result, the resulting fiber comprises a protein and/or peptidic component. Examples of the protein component include soy-based materials such as soy-protein concentrate, soy flours, and/or soy-protein isolates. Other protein components come from sources of protein such as whey, gluten, zein, albumin, gelatin, and others. In certain embodiments, the protein components are denatured. In some embodiments, the proteins are from an animal source or a plant source. In certain embodiments, the protein component is a proteoglycan. In some embodiments, the protein-based solution comprises a carrier polymer. Examples of carrier polymers include, but are not limited to, polyvinyl alcohol, polyethylene oxide, or polyethylene glycol. In further embodiments of any fiber described herein, the polymer comprises supplemental components or solutions. In various embodiments, such supplemental components or solutions are used to modify aspects of the resulting fibers, like moisture resistance, moisture sensitivity, stiffness, tensile strength. Supplemental components or solutions comprise, but are not limited to, fatty acids, micro-scale and nano-scale particulates such as titanium oxide, nano-clay, nanocrystalline cellulose, cellulose nanocrystals, nanofibrillated cellulose, bio-char, pH modifiers, surfactants, or antimicrobial agents.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

Example 1

A comprehensive model for non-isothermal polymer melt electrospinning has been developed. See, Polymer 51 (2010) 274-290. Momentum, mass, and energy conservation equations were derived for a conical jet section and reduced to a 1-D formulation using thin filament approximation. The conservation equations were coupled with diverging electric field and non-isothermal viscoelastic constitutive models. In-flight crystallization equations relevant to a number of fast-crystallizing polymers, i.e. Nylon-6 (N6) and polypropylene (PP), were included. The model approach was validated for amorphous (PLA) and crystallizing (PP, N6) polymers by comparison to experimental jet radius, temperature, and crystallinity profiles from melt electrospinning. To shed more light on the GAME process and the mechanism of the observed increased attenuation rate, and to aid in further process improvement and optimization, the previous melt electrospinning model can be modified to account for the drag and thermal effects of the heated air jet. The shear stress due to air drag, $\tau_D$, has been incorporated using the following correlation:

$$\tau_D = \frac{1}{2}\rho_{AIR}C_D(V_{AIR} - V)^2, \qquad (1)$$

where $\rho_{AIR}$ is the air density, $C_D$ is the skin friction coefficient, $V_{AIR}$ is the axial air velocity, and V is the axial melt jet velocity. As an assumption, only the stress component tangential to the melt jet surface is significant. The skin friction coefficient can be computed using:

$$C_D = BRe_{AIR}^{-0.61}, \qquad (2)$$

where B is a drag coupling parameter, which typically ranges from 0 to 0.6, and $Re_{AIR}$ is the air Reynolds number, defined with respect to the melt jet radius, R.

The effect of stagnant air drag was investigated and was found negligible in the full range of acceptable B values and typical melt inlet temperatures. This was due to relatively low jet velocities, ranging from 0.0013 m/s at the nozzle to 3 m/s near the collector. This study demonstrated that significant air velocities, on the order of 100 m/s, were preferred to produce the desired additional jet attenuation.

Example 2

Various forced air velocities and temperatures were considered, as shown in FIG. 7. The forced air velocities and temperatures were taken to be constant and independent of the axial jet position for this illustration. It was observed that the initial attenuation rate remained relatively unchanged by the air drag, even at the highest practical air velocities, close to the speed of sound. This observation confirmed that the applied electric field is the dominant jet thinning force, and it is in agreement with observations from fiber blowing which exhibited low attenuation rates. However, further downstream away from the spinneret, where the electrical driving force decreased due to the divergent electric field, the air drag effects became apparent and the jets were thinned further than in the stagnant air case. In some cases, e.g. at $T_{AIR}$=373K (see FIG. 7), as much as a 3-fold additional thinning was observed due to the forced air jet drag. This enhancement was not as pronounced at the extreme temperature conditions due to a) jet solidification at lower ambient temperatures and b) high internal stresses developed during rapid initial attenuation at higher temperatures. In addition, effects of varying the value of B were similar to effects of varying the air velocity.

Example 3

Figure 8:
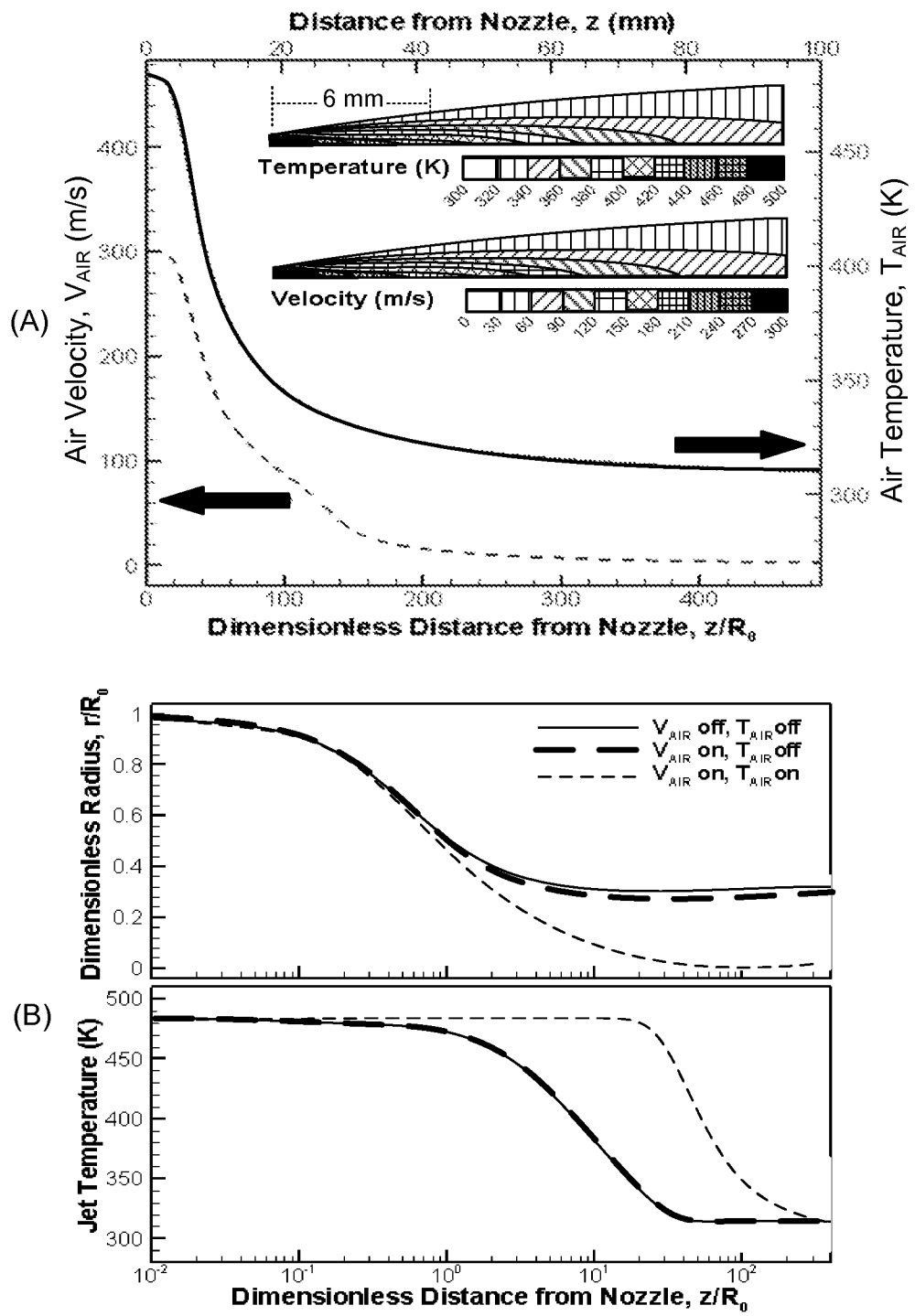
FIG. 8 shows (A) heating air temperature and velocity profiles from finite volume analysis, and (B) corresponding melt electrospinning model results.

The actual air velocity and temperature profiles were evaluated. Because the dynamics of a coupled process are prohibitively complex, an approach similar to that used for a fiber blowing process was used. See, Fibers and Textiles in Eastern Europe 15, 77 (2007). The air velocity and temperature profiles were approximated to be independent of the polymer jet dynamics and were evaluated numerically using finite volume analysis (with FLUENT™). In the simulation, a high velocity (300 m/s) turbulent air jet at 483K was injected into the spinning region, which was initially stagnant air at 300K, and the steady-state solution was calculated (FIG. 8(A)). The resulting axial air velocity and temperature profiles were then used in the modified melt electrospinning model for the calculations of air drag and heat transfer, as shown in FIG. 8(B). Air drag alone resulted in slight additional jet thinning (final fiber diameter=57 μm, compared to 63 μm for the base case). However, the additional heating provided by the air jet resulted in drastically enhanced and prolonged jet attenuation and consequently significantly thinner final jet diameter (2.9 μm). Thus, the heated air jet resulted in a 20-fold decrease in the final fiber diameter according to the model, consistent with experimental results presented in FIG. 9 and Example 4. There is a 10-fold difference in the absolute values for the final fiber thicknesses between the model and the experimental results, which was due to the whipping motion of the jet in experiments and which was not accounted for in the stable jet model. The additional jet thinning due to whipping is expected to be the same in the stagnant air and gas-assisted processes, since forced air jet velocity and temperature quite rapidly decline to stagnant ambient air levels, as shown in FIG. 8(A).

Example 4

Figure 9:
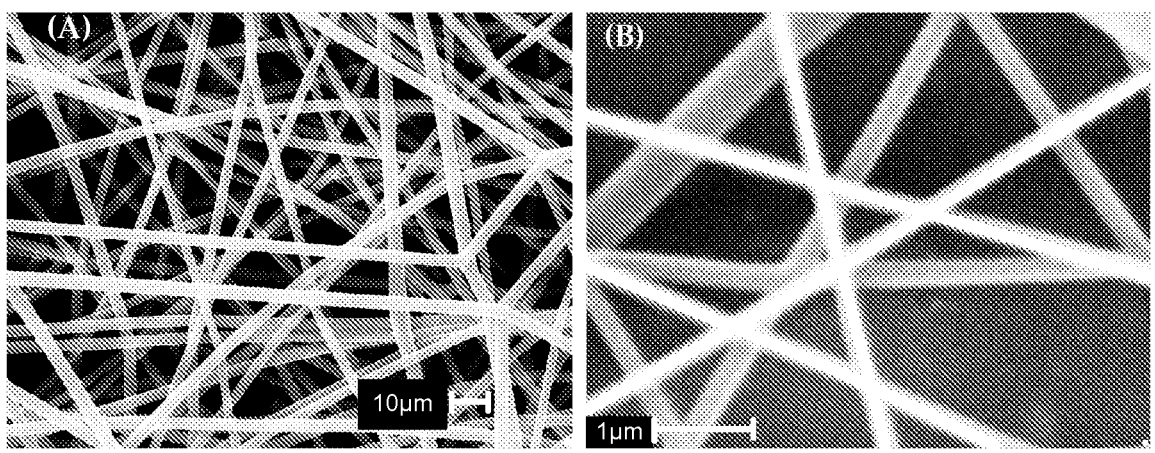
FIG. 9 shows scanning electron microscope (SEM) images of as-melt electrospun PLA fiber mats; (A) without gas assisted spinneret (scale bar: 10 μm) and (B) with gas assisted system (scale bar: 1 μm).

Polylactic acid (PLA) (MW 186 kDa) was provided from Cargill Dow. The PLA chips were loaded into a glass syringe and heated up to 220-240° C. to melt them. The molten polymer was pumped into the inner channel of the spinneret according to FIG. 1, while hot air gas passed through the outer channel. The gas was heated to 210° C. and its velocity at the nozzle was 300 m/s. The distance between the nozzle and collection plate was kept at about 9 cm and a melt flow rate of about 10 μl/min was maintained. A charge of +20 kV was maintained at the collector. The process settings are summarized in Table 1. FIG. 9 shows SEM images of typical melt electrospun PLA nanofibers. The melt system with a gas-assisted spinneret produced much finer fiber mats than a system without the gas-assisted spinneret.

TABLE 1

| PLA melt electrospinning process settings | |
|---|---|
| Inner (melt) nozzle | $4.13 \times 10^{-4}$ m ID, $7.18 \times 10^{-4}$ m OD |
| Outer (air) nozzle | $1.194 \times 10^{-3}$ m ID |
| Melt flowrate | $1.67 \times 10^{-10}$ m$^3$/s |
| Air velocity @ nozzle | 300 m/s |

TABLE 1-continued

PLA melt electrospinning process settings

| | |
|---|---|
| Melt temperature @ nozzle | 483K |
| Air temperature @ nozzle | 483K |
| Applied potential | $2 \times 10^4$ V (collector), 0 V (nozzle) |
| Nozzle to collector distance | 0.09 m |

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A process for forming nanofibers, comprising:
melting a polymer to form a polymer melt;
providing the polymer melt to a center tube, the center tube comprising a first supply end and an opposing first nozzle end, the center tube defining a center chamber along a longitudinal axis, the polymer melt being provided to the first supply end;
providing a high velocity gas via a second tube disposed in surrounding relation to the center tube, the second tube comprising a second supply end and an opposing second nozzle end, the gas supply tube defining an outer chamber along the longitudinal axis, and the high velocity gas having a velocity of greater than 0.01 m/s;
heating the gas with a heater configured to heat the gas within the second tube;
applying a voltage to the center tube, forming a charged liquid polymer jet; and
collecting hardened nanofibers formed from the charged liquid polymer jet.

2. The process of claim 1, wherein the first nozzle end and the second nozzle end are in the same axial position along the longitudinal axis.

3. The process of claim 1, wherein the hardened nanofibers have a diameter in the range of 50 nm to 10 μm.

4. The process of claim 1, wherein the gas velocity is in the range of 1 m/s to 300 m/s.

5. The process of claim 1, wherein the gas stream temperature is in the range of 313° K to 523° K.

6. The process of claim 1, wherein the polymer comprises a thermoplastic polymer.

7. The process of claim 1, wherein the hardened nanofibers have a diameter in the range of about 200 nm to about 5 μm.

8. The process of claim 1, wherein the first nozzle end is offset from the second nozzle end by about 0.1 μm to about 20 μm.

9. The process of claim 1, wherein the high velocity gas is provided via the second tube by providing pressurized gas to the second supply end of the second tube.

10. The process of claim 1, wherein the polymer is selected from the group consisting of rubber, polycarbonate, polystyrene, poly(methyl methacrylate), poly(lactic acid), polyethylene terephthalate, polybutylene terephthalate, nylon 6, polypropylene, polyethylene, nylon 6,6, and combinations thereof.

* * * * *